Figure 1:
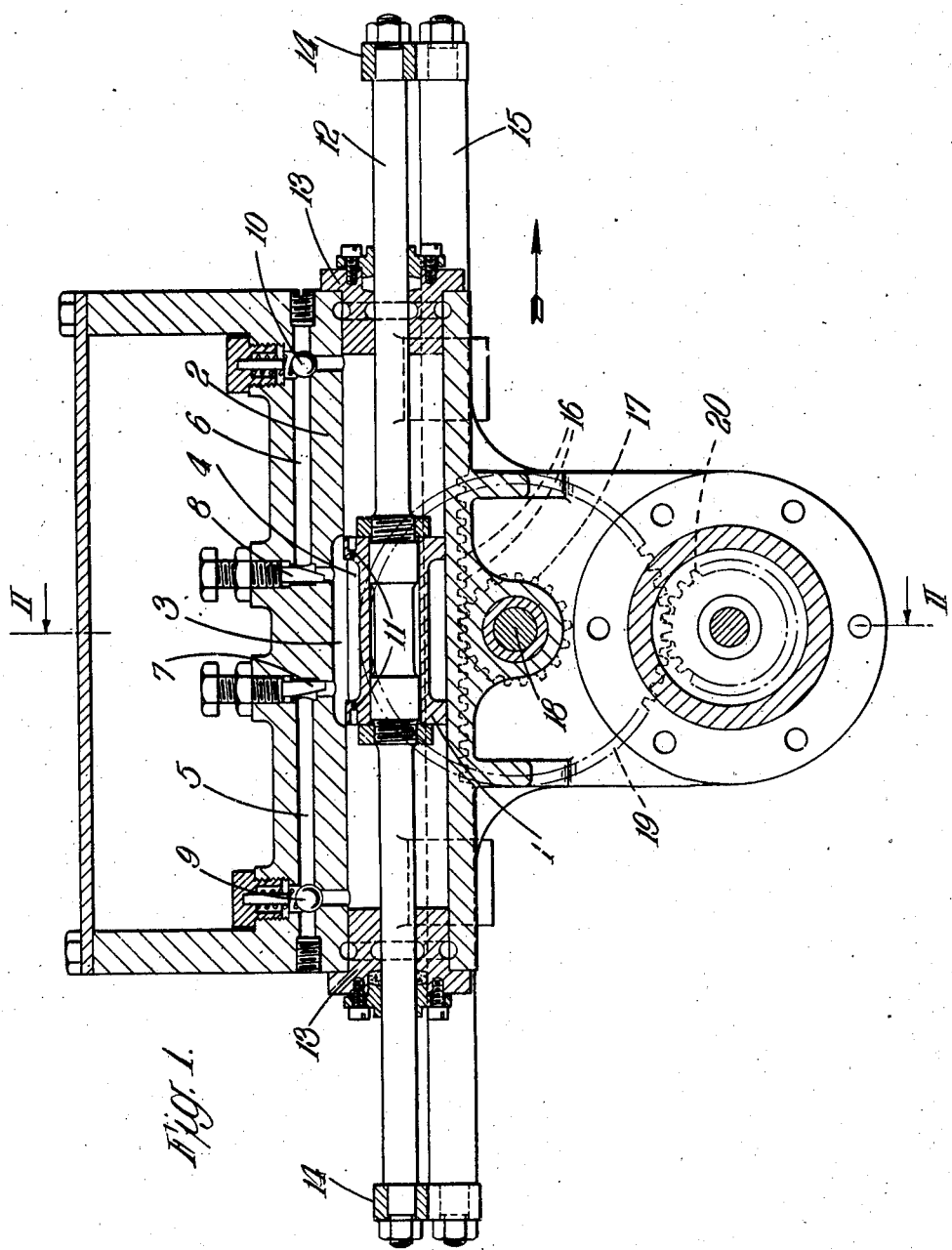

July 2, 1946.  J. H. ABBINK-SPAINK ET AL  2,403,321
HYDRAULIC DASHPOT RETARDING DEVICE
Filed March 19, 1942  2 Sheets-Sheet 1

July 2, 1946. J. H. ABBINK-SPAINK ET AL 2,403,321
HYDRAULIC DASHPOT RETARDING DEVICE
Filed March 19, 1942 2 Sheets-Sheet 2
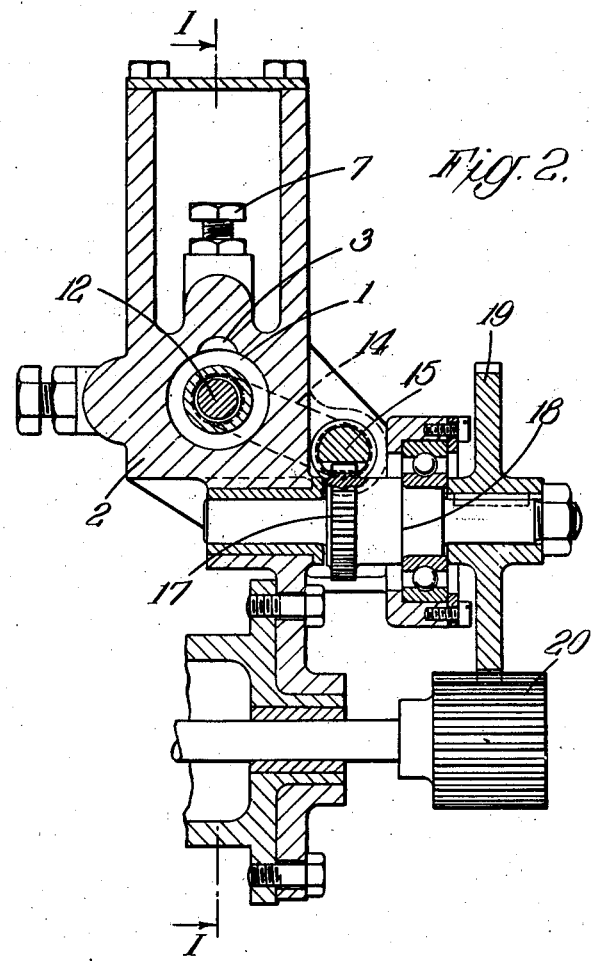

Patented July 2, 1946

2,403,321

UNITED STATES PATENT OFFICE 2,403,321

HYDRAULIC DASHPOT RETARDING DEVICE

Johann Hermann Abbink-Spaink, Jesmond, Newcastle-on-Tyne 2, and Arthur Spencer, Benwell, Newcastle-on-Tyne 5, England, assignors to Vickers-Armstrongs Limited, London, England, a company of Great Britain Application March 19, 1942, Serial No. 435,351
In Great Britain March 26, 1941

4 Claims. (Cl. 188—97)

This invention relates to hydraulic dash-pot retarding devices of the kind including a piston slidably mounted within a cylinder containing the hydraulic damping fluid, the chief object being to evolve an improved form of dash-pot of the above type having a uniform or substantially uniform retarding effect during movement of the piston in either direction within the cylinder.

An hydraulic dash-pot retarding device in accordance with the present invention comprises a cylinder containing the hydraulic damping fluid and a piston slidably mounted therein, the piston and cylinder having cooperating channels or passages which are in permanent communication during the whole of the sliding movement of said piston. These cooperating channels are also connected with the opposite ends of the cylinder beyond the range of movement of said piston by further passages each arranged to permit the controlled one-way flow of oil out of one end of said cylinder toward which the piston moves and into said cooperating channels which at the same time are placed in communcation with the other end of the cylinder by movement of the piston away from its central position. As the piston returns to its central position, additional passages therein permit the slow passage of damping fluid past the piston and into the appropriate end of the cylinder.

Referring to the drawings—

Figure 1 is a vertical section on the line I—I in Figure 2 of an hydraulic dash-pot retarding device constructed in accordance with the invention; and Figure 2 is a transverse sectional view on the line II—II in Figure 1.

The hydraulic dash-pot retarding device illustrated comprises a piston 1 slidably mounted within a cylinder 2 having a centrally arranged channel 3, the piston being waisted to provide a surrounding passage or channel 4 in permanent communication with the channel 3 throughout the range of sliding movement of the piston. Further passages 5 and 6 connect the channel 3 with opposite ends of the cylinder, said passages communicating with said cylinder at points beyond the range of movement of the piston. The passages 5 and 6 contain respectively adjustable needle valves 7 and 8 and one-way non-return spring urged ball valves 9 and 10, which needle valves and non-return ball valves control the flow of the hydraulic damping fluid through said passages. The piston 1 is provided with small diameter bleed holes 11 at its opposite ends for a purpose hereinafter referred to.

The piston 1 is mounted upon a shaft 12 slidably mounted within bearing members 13 which close the cylinder 2 at its opposite ends, the shaft 12 being connected at its ends by coupling members 14 with a further parallel shaft 15, the centre part of which is formed with rack teeth 16 which are engaged by a toothed pinion 17, the latter being formed on a shaft 18 to which is secured a gear wheel 19 meshing with a driving pinion 20. Rotational movement of the pinion 20 thus causes endwise movement of the piston through the medium of gear wheel 19, pinion 17, and shafts 12 and 15.

In operation, assuming the piston to be displaced from its mid position to the right in the direction of the arrow, fluid is compressed in the right hand end of the cylinder and is forced past the non-return valve 10 into the passage 6 and past the needle type control valve 8 into the channel 3, thereby re-entering the cylinder at the opposite side of the piston.

On returning the piston to its mid position, fluid is now compressed in the opposite or left hand end of the cylinder and forced into the channel 3, and passage 6, thus holding the non-return valve 10 closed, the fluid passing through the right hand bleed hole 11 into the right hand end of the cylinder.

When the piston is displaced from the mid position in the opposite direction to that indicated by the arrow, the sequence of operation is the same except that passage 5, needle control valve 7 and non-return valve 9 are used.

What we claim and desire to secure by Letters Patent of the United States is:

1. An hydraulic dash-pot retarding device comprising a cylinder containing the hydraulic damping fluid, a piston slidably mounted therein, means for effecting sliding movement of said piston, said cylinder being formed with a centrally arranged channel and said piston being formed with a further channel or passage in permanent communication with the channel in the cylinder during the whole of the sliding movement of said piston, two passages connecting said cylinder channel with said cylinder at the opposite ends thereof beyond the range of movement of said piston and said passages each containing a non-return valve permitting of the flow of oil from said cylinder only, and a needle valve or like controlling device for controlling the flow of oil through said passages, and said piston being formed to provide small passages permitting the slow passage of oil past said piston.

2. An hydraulic dash-pot retarding device as claimed in claim 1, wherein the non-return valves are in the form of spring urged ball valves.

3. An hydraulic dash-pot retarding device as claimed in claim 1, wherein the piston is waisted to provide a surrounding passage in permanent communication with the channel in the cylinder.

4. An hydraulic dash-pot retarding device as claimed in claim 1, wherein the piston is mounted on a shaft slidable axially within the cylinder and projecting from both ends thereof, said shaft being connected at its ends with a further parallel shaft having rack teeth engaged by a pinion for the purpose of imparting sliding movement to the piston.

JOHANN HERMANN ABBINK-SPAINK.
ARTHUR SPENCER.